Aug. 26, 1969   H. L. KAYLIE   3,464,006
R-F ATTENUATION MEASUREMENT APPARATUS OF THE I-F SERIES
SUBSTITUTION TYPE, WITH NOISE INJECTION FOR
COMPENSATION OF ERROR DUE TO MIXER NOISE
Filed June 1, 1967

INVENTOR.
HARVEY L. KAYLIE
BY *Henry Huff*
ATTORNEY.

United States Patent Office 3,464,006
Patented Aug. 26, 1969

3,464,006
R-F ATTENUATION MEASUREMENT APPARATUS OF THE I-F SERIES SUBSTITUTION TYPE, WITH NOISE INJECTION FOR COMPENSATION OF ERROR DUE TO MIXER NOISE
Harvey L. Kaylie, Brooklyn, N.Y., assignor to Cutler-Hammer, Inc., Milwaukee, Wis., a corporation of Delaware
Filed June 1, 1967, Ser. No. 642,965
Int. Cl. G01r 27/28
U.S. Cl. 324—57   6 Claims

ABSTRACT OF THE DISCLOSURE

A superheterodyne test receiver with a calibrated adjustable I-F standard attenuator, and a noise generator to compensate error-producing change of the output noise level with change of the attenuator setting.

BACKGROUND

Field of the invention

Figure 1:
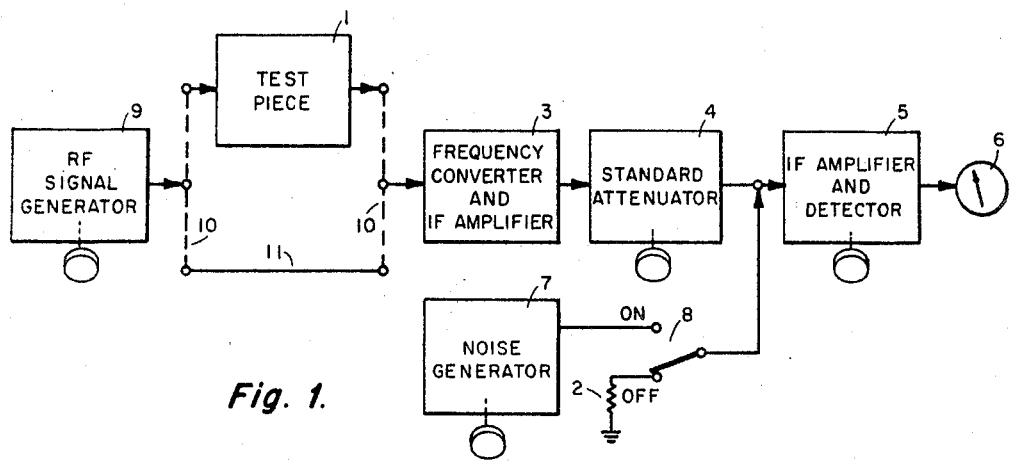

Measurement of changes in amplitude of high frequency signals, for calibration and testing of radio equipment and determination of characteristics such as gain, attenuation, selectivity and noise figure.

The prior art

I-F substitution measurement systems per se are well-known, and are of two general types: parallel substitution, and series substitution. In both types, the R-F signal to be measured is converted by means of a mixer and local oscillator to an I-F signal of some standard frequency, typically 30 megacycles per second. Any change in amplitude of the R-F signal results in a corresponding change in amplitude of the I-F signal, and the latter is what is actually measured. Both types of systems are subject to error caused by noise generated in the mixer.

In the parallel type system, the output of a standard I-F generator is passed through a calibrated attenuator which is adjusted to equalize the amplitude of its output with that of the mixer I-F output. When the R-F input level changes, the attenuator is readjusted to again equalize its output with the new mixer output. The change in attenuator setting is a measure of the change in R-F input level. The mixer output contains substantially more noise than the I-F generator output. The difference in noise level can introduce comparison errors in equalizing the I-F signals. Such error can be reduced by adding noise to the I-F generator output to balance the mixer noise, as shown in U.S. Patent 3,098,968.

Series substitution systems do not use an I-F generator; the calibrated attenuator is placed between the mixer and the second detector, and is adjusted to a reference setting when the R-F input signal amplitude is at a first level, then readjusted to a measurement setting that produces the same output level when the input signal amplitude is changed to a second level. The change in attenuator setting is a measure of the change in input signal level. Heretofore the measurement range of series substitution systems has been restricted to about 75 db, because the noise contribution to the indicated output varies with the attenuator setting.

SUMMARY

According to this invention, a noise generator is arranged to inject noise at a point in the system following the standard attenuator, whenever the attenuator is at a measurement setting that differs from the reference setting by more than a predetermined amount, say 45 db. Said setting is not critical, but should differ from the reference setting by substantially less than the measurement range wherein variation in the noise level begins to introduce perceptible error in indication of the I-F signal level.

The level of the injected noise is adjusted to equal the noise level that exists at the injection point when the standard attenuator is at its reference setting and the noise generator is disconnected. During the subsequent measurement operation, the same noise level exists at the second detector with both the reference and measurement settings of the standard attenuator, thus obviating errors resulting from variation in attenuation of the mixer noise.

Another aspect of the invention relates to improvement in resolution of the signal level indication under low signal-to-noise ratio conditions such as are encountered when the attenuation being measured is very high. This is accomplished by modulating the I-F signal at some relatively low frequency, for example 1000 cycles per second, and providing a synchronous detector following the second detector. The synchronous detector acts as an extremely narrow band filter, greatly improving the signal-to-noise ratio at the indicator.

Figure 2:
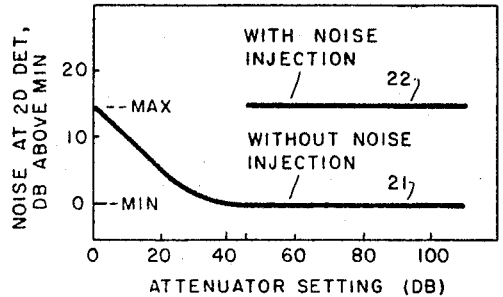
Figure 4:
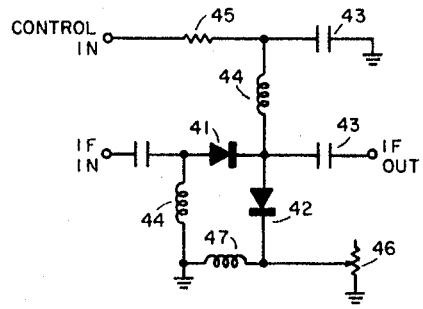
Figure 3:
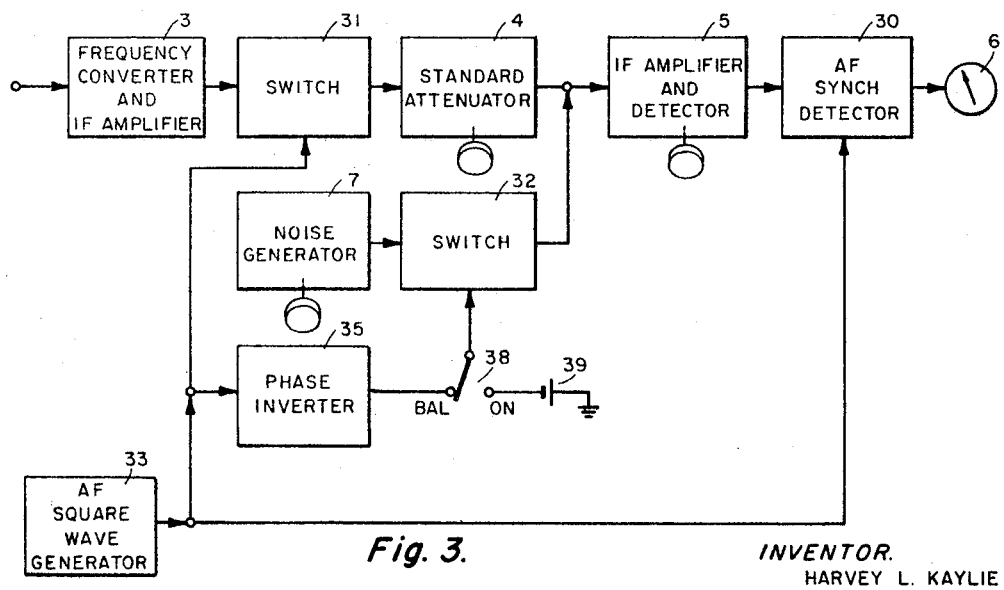

The invention will be described with reference to the accompanying drawing, wherein:

FIG. 1 is a block diagram of a simplified embodiment of the invention, useful in explaining some of the principles thereof, FIG. 2 is a graph illustrating noise level at the output indicator as a function of attenuator setting, with and without noise injection, FIG. 3 is a block diagram of a presently preferred embodiment including means for internal modulation, coherent detection and noise source switching, and FIG. 4 is a circuit diagram of a switch device suitable for the system of FIG. 3.

FIG. 1 shows a test receiver set up for measuring the attenuation of a test piece 1 at a selected frequency. The test receiver itself comprises a frequency converter and I-F amplifier 3, a standard I-F attenuator 4, output indicator means including an I-F amplifier and detector 5 and output meter 6, and a noise generator 7, adapted to be connected through a switch 8 to the output indicator 5, 6. An R-F signal generator 9 is arranged, as indicated by dash lines 10, to be coupled to the test receiver alternatively through the test piece 1 and through a direct connection 11.

The frequency converter, attenuator, I-F amplifiers and output indicator may all be of well known types and need not be described in detail. The I-F frequency may be 30 megacycles per second; the bandwidth of the amplifiers and frequency converter may be about one megacycle per second, to provide tolerance for minor variations in frequency of the signal generator 9 without consequent appreciable variations in I-F gain. Suitable stabilization means may be provided maintaining the converter output frequency relatively constant within the I-F pass band.

The noise generator 7 is designed to provide an output which will have the same effect on the detector as the noise produced by the mixer and first I-F amplifier stage in the frequency converter 3. To this end, the noise generator 7 may consist of a source of thermal noise, such as a resistor, and an I-F amplifier with a pass band centered at 30 megacycles. In order to maintain the same impedance level at the noise injection point when the noise generator 7 is connected and disconnected, the switch 8 is of the double throw type, arranged as shown to connect the noise generator when in its upper, on, position, and to substitute a resistor 2 when in its off position. The resistor 2 is equal to the output impedance of the noise generator.

In the operation of the system in FIG. 1, the following adjustments are made prior to the actual measurement.

The signal generator 9 is turned off or disconnected, switch 8 is turned off and the converter-amplifier 3 and amplifier-detector 5 are energized for operation. At this time the input to the second detector in unit 5 will be noise only. The standard attenuator 4 is adjusted to its minimum attenuation setting, as indicated by zero on the calibration. This setting is referred to as the reference setting. The I-F gain of unit 5 is then adjusted to make the output meter 6 show a conveniently readable indication in response to the noise, say approximately full scale.

Referring to FIG. 2, the noise level at the second detector will vary with the setting of the standard attenuator as shown by the curve 21. When the attenuator is at its reference (zero) setting, the noise is at its maximum level, and consists predominantly of noise originating in the mixer. As the attenuation is increased, the noise level decreases toward a constant minimum value. This minimum level, shown as zero db in FIG. 2, results from thermal noise generated in the attenuator 4, resistor 2 and the following I-F amplifier in unit 5.

With the standard attenuator 4 adjusted to its maximum setting and the gain of unit 5 unchanged, the output meter 6 will show an indication corresponding to the minimum noise level. Switch 8 is now turned on, and the output level of the noise generator 7 adjusted to make the meter 6 show the same indication, full scale, as it did when the standard attenuator was at its reference setting and switch 8 was off. Referring to FIG. 2, line 22 represents the noise level at the second detector with switch 8 on. Throughout the range of attenuator adjustment above about 45 db, the noise level remains constant, and equal to the noise level with the attenuator at its reference setting and switch 8 off.

The signal generator 9 is adjusted to provide output of the desired frequency, at a level safely below the upper limit of linear operation of the mixer in unit 3. The standard attenuator 4 is adjusted to its reference setting, switch 8 is turned off, and the generator 9 is connected to the converter-amplifier 3 through the test piece 1. The gain of the amplifier-detector 5 is now readjusted to make the output meter 6 show some conveniently readable indication, say between half scale and full scale, and the indication is noted. This indication is hereinafter denoted as the reference indication.

It should be observed at this time that the reference indication represents the sum of the signal as passed by the test piece and noise. Substantially all of the noise is that generated in the converter-amplifier and amplified and detected with the signal. The noise level of the system, referred to the converter input, is typically 90 db below the maximum signal input that the converter-amplifier can accommodate within its linear range. Accordingly, if the attenuation of the test piece 1 is less than about 50 db, the noise level at the output meter will be 40 db or more below signal level, and will contribute less than 1% to the indication. However, if the attenuation of the test piece is more than about 60 db, a significant part of the reference indication will be the result of noise.

After the reference indication has been obtained, the test piece is removed or bypassed and the generator 9 connected directly to unit 3. The attenuator 4 is adjusted to a setting hereinafter referred to as the measurement setting, that makes the output meter 6 return to the same indication as the previously obtained reference indication. Assuming the switch 8 to have been left off, the output being indicated by the meter 6 at this time is essentially signal only; with the direct connection of the generator 9 to the mixer, the signal level is so much higher than the noise level that the latter is imperceptible.

If the attenuation of the test piece 1 were low enough, say less than 50 db. the noise would also have been imperceptible when the reference indication was obtained, as explained above. In such case, the measurement setting of the standard attenuator would represent the attenuation of the test piece within a fraction of a db, regardless of whether switch 8 is on or off. However, if the attenuation of the test piece were say 100 db, the reference indication would have been largely due to noise, while the same meter indication with the measurement setting would represent substantially more signal. In this case, the measurement setting of the standard attenuator would represent an attenuation appreciably lower than the actual attenuation of the test piece. The error would depend not only on the attenuation of the test piece, but also upon other factors such as the output level of the generator 9. Such effects would remain sufficiently constant during a measurement run, but cannot be predetermined or controlled with enough precision to enable practical use of compensating calibration or an error chart.

Accordingly, when the attenuation being measured is more than about 45 db, the switch 8 is moved to its "ON" position. The operation can be effected automatically if desired, by obvious means such as a cam on the adjustment mechanism of the standard attenuator 4. With switch 8 on, the noise level at the second detector is independent of the attenuator setting, remaining constant as shown by line 22 in FIG. 2, at the same level as existed when the test piece 1 was connected and the attenuator was at its reference setting. When the attenuator 4 is adjusted to make the meter 6 return to the reference indication, both the signal level and the noise level are the same as they were when the reference setting was made. The measurement setting then represents the actual attenuation with an accuracy determined principally by that of the standard attenuator itself, typically within ±0.2 db for a 100 db measurement.

The simple basic system of FIG. 1 is capable of precise single step attenuation measurements of 100 db or more. However, when the attenuation being measured is very high, the signal component of the output may be small with respect to the (constant) noise component, causing difficulty in observation of the change in signal level during adjustment of the standard attenuator to its measurement setting. Also, routine checking of the injected noise level is somewhat cumbersome because the standard attenuator must be run from one extreme of its adjustment range to the other each time the check is made, requiring perhaps forty complete turns of the adjustment knob in either direction.

The foregoing inconveniences are eliminated by the addition of cyclical switching means to the basic system. Referring to FIG. 3, an electrically operated switch 31 is provided between the converter-amplifier 3 and the standard attenuator 4, and a similar switch 32 is connected between the noise generator 7 and the output of the standard attenuator. The switches 31 and 32 are on-off devices each having an input terminal, an output terminal and a control terminal, any may be circuits of the type shown in FIG. 4 and described below. An audio frequency (e.g. 1000 cycles per second) generator 33 is connected directly to the control terminal of switch inverter 35 to one fixed contact of a manually operable double throw switch 38. The other fixed contact of the switch 38 is connected to a D-C source 39 of such polarity as to hold switch 32 continuously closed when switch 38 is thrown to its right hand position, designated "ON" in FIG. 3.

The square wave generator 33 makes the switch 31 alternately open and close 1000 times per second. The phase inverter 35 provides a square wave output substantially identical to that of the generator 33, but 180 degrees out of phase with it. When the manual switch 38 is in its left hand position, designated "BAL" in FIG. 3, switch 32 also opens and closes 1000 times per second, being open when switch 31 is closed, and closed when switch 31 is open.

A synchronous detector 30 is provided between the amplifier-detector 5 and the output meter 6. The synchronous detector is a circuit of known type, commonly referred to also as a phase sensitive detector, which produces an output of a polarity determined by the relative phase of the signal and control voltages. The control voltage in this case is the square wave output of generator 33, which reverses polarity 1000 times per second, in synchronism with the opening and closing of switches 31 and 32.

In the operation of the system of FIG. 3, the preliminary adjustment of injection noise level is made with the manual switch 38 set to its "BAL" position, the standard attenuator 4 set to zero, and the R-F signal generator 9 (not shown in FIG. 3) turned off. The switches 31 and 32 operate to alternately apply the noise output of converter-amplifier 3 (through attenuator 4) and the output of noise generator 7 to the amplifier-detector 5. The synchronous detector 30 provides a D-C output of an amplitude that depends on the difference between the two noise levels and a polarity that depends on which of the noise levels is larger.

Assume the polarity of the meter connection to be such as to produce upscale deflection when the noise output of the converter-amplifier 3 is larger than that of the noise generator 7. The meter may be designed or adjusted in known manner to facilitate reading of downscale deflection from its zero indication.

The output level of noise generator 7 is adjusted to reduce the deflection of meter 6 to zero, indicating that the injected noise level is the same as the mixer noise level. The sensitivity of the indication depends upon the gain of the I-F amplifier in unit 5, which should be made sufficient to enable precise adjustment of the noise generator 7.

After the noise adjustment is completed, the R-F signal generator is adjusted as described with reference to FIG 1 above and coupled through the test piece to the converter-amplifier 3. The standard attenuator is left at its reference setting and switch 38 is left in its "BAL" position. At this time the detected output of unit 5 consists of mixer noise plus signal when switch 31 is conducting, and injection noise only when switch 32 is conducting. With the noise levels balanced as described, the deflection of the meter will be upscale and will represent signal only. The gain of unit 5 is adjusted to produce the reference indication, as in the operation of the system of FIG. 1, and then the test piece is removed and the R-F signal generator connected directly to the converter-amplifier 3.

The standard attenuator 4 is then adjusted to return the meter 6 to the reference indication. If the attenuation is more than about 45 db, the switch 38 is thrown to its "ON" position while the measurement setting is being made. The detected output of unit 5 at this time consists of injected noise plus signal when switch 31 conducts, and the same injected noise only when switch 31 does not conduct. Owing to the phase sensitive characteristic of the synchronous detector 30 and random phase variation of the noise, the average meter deflection represents signal only. The resolution of both the original reference indication and the duplicate indication obtained when the attenuator 4 is adjusted to its measurement setting substantially the same as it would be in the absence of noise, greatly facilitating precise adjustment of the attenuator to its measurement setting.

The noise balance may be checked readily at the beginning of each measurement, when the standard attenuator is at its reference setting and switch 38 at "BAL," by simply turning off the R-F signal generator and observing the output meter.

Referring to FIG. 4, switches 31 and 32 of FIG. 3 each consist of a pair of unidirectionally conductive diodes 41 and 42 connected as shown with capacitors 43 and inductors 44 arranged to isolate the control signal from the I-F signal or noise to be switched. Resistor 45 limits the current flow through the diodes when they are conductive. An adjustable resistor 46 is connected in series with diode 42, and is shunted by an inductor 47.

When the control input is negative with respect to ground, diode 41 is forward biased and is conductive, and diode 42 is back biased and nonconductive. Under this condition the switch is closed, i.e. conductive from input to output. When the control input is positive with respect to ground, diode 41 is back biased and diode 42 is forward biased. The switch is open between input and output, and the output is connected through resistor 46 to ground. The resistor 46 is adjusted to make the I-F impedance at the switch output the same when the switch is open as it is when the switch is closed, like the resistor 2 in FIG. 1.

The diodes in switch 31 may be reversed with respect to those in switch 32, and phase inverter 35 omitted. Each switch may include two or more circuits like that of FIG. 4 connected in cascade to provide greater isolation between input and output when the switch is open.

The term "noise signal" as used in the appended claims is intended to mean generally any electrical variation which will have the same effect on the detector in the output indicator as noise produced by the mixer and I-F amplifier in the frequency converter.

What is claimed is:
1. Apparatus for measurement of a change in amplitude of an oscillatory signal from one level to another, by series substitution of attenuation in a channel that operates at a standard frequency, including
   (1) in cascade,
      (a) a frequency converter for converting said oscillatory signal to a signal of said standard frequency,
      (b) a calibrated adjustable attenuator designed for operation at said standard frequency, and
      (c) means for indicating the amplitude of the output of the calibrated attenuator,
   (2) means for generating a noise signal,
   (3) means for adjusting the magnitude of said noise signal, and
   (4) means for applying said adjusted noise signal to said output amplitude indicating means in addition to the output of said attenuator.
2. The invention set forth in claim 1, further including
   (1) means for effecting amplitude modulation of the standard frequency output of said frequency converter, and
   (2) selective means in said output signal amplitude indicating means for restricting its response to substantially only standard frequency signals so modulated.
3. The invention set forth in claim 2, wherein said means for effecting modulation includes an A-C signal generator, and said frequency selective means includes a synchronous detector.
4. The invention set forth in claim 3, wherein said means for effecting modulation includes a switch device operated by said A-C generator.
5. The invention set forth in claim 4, further including a second switch device between said noise signal generator and said amplitude indicating means, and means for operating said second switch device in phase opposition with respect to the first switch device during adjustment of the magnitude of said noise signal.
6. The invention set forth in claim 5, further including means to connect said noise generator to said amplitude indicating means when said attenuator is at other than its reference setting.

References Cited

UNITED STATES PATENTS

| | | | |
|---|---|---|---|
| 2,755,436 | 7/1956 | Heinz | 324—57 |
| 3,038,119 | 6/1962 | Billig et al. | 324—57 |
| 3,243,699 | 3/1966 | Kummer | 324—57 |
| 3,341,773 | 9/1967 | Julie | 324—57 |

EDWARD E. KUBASIEWICZ, Primary Examiner

U.S. Cl. X.R.

324—140